(12) United States Patent
Higuchi et al.

(10) Patent No.: US 8,243,839 B2
(45) Date of Patent: Aug. 14, 2012

(54) BASE STATION, MOBILE STATION AND METHOD

(75) Inventors: Kenichi Higuchi, Saitama (JP); Mamoru Sawahashi, Yokohama (JP)

(73) Assignee: NTT Docomo, Inc., Tokyo (JP)

( * ) Notice: Subject to any disclaimer, the term of this patent is extended or adjusted under 35 U.S.C. 154(b) by 0 days.

(21) Appl. No.: 13/107,556

(22) Filed: May 13, 2011

(65) Prior Publication Data

US 2011/0216844 A1 Sep. 8, 2011

Related U.S. Application Data

(63) Continuation of application No. 11/917,719, filed as application No. PCT/JP2006/311877 on Jun. 13, 2006, now Pat. No. 8,059,731.

(30) Foreign Application Priority Data

Jun. 14, 2005 (JP) .................................. 2005-174399

(51) Int. Cl.
*H04L 27/28* (2006.01)
(52) U.S. Cl. .................... 375/260; 375/295; 375/259
(58) Field of Classification Search .................. 375/259, 375/260, 295
See application file for complete search history.

(56) References Cited

U.S. PATENT DOCUMENTS

| 6,075,996 | A | 6/2000 | Srinivas |
| 6,785,514 | B1 | 8/2004 | Raaf |
| 7,095,707 | B2 | 8/2006 | Rakib et al. |
| 7,155,193 | B2* | 12/2006 | Rowe et al. .................... 455/296 |
| 7,274,652 | B1 | 9/2007 | Webster et al. |
| 7,508,790 | B2* | 3/2009 | Jou .............................. 370/329 |
| 7,787,431 | B2* | 8/2010 | Li et al. ......................... 370/343 |
| 2004/0028160 | A1 | 2/2004 | Bienek et al. |
| 2004/0264548 | A1* | 12/2004 | Miyoshi ........................ 375/141 |

FOREIGN PATENT DOCUMENTS

| CN | 1186401 A | 7/1998 |
| CN | 1516384 A | 7/2004 |
| JP | 2002-543675 A | 12/2002 |
| JP | 2003-348648 A | 12/2003 |
| JP | 2004-007279 A | 1/2004 |
| JP | 2005-502218 A | 1/2005 |

(Continued)

OTHER PUBLICATIONS

International Search Report for PCT/JP2006/311877 mailed Sep. 19, 2006, 2 pages.

(Continued)

*Primary Examiner* — Siu Lee
(74) *Attorney, Agent, or Firm* — Osha Liang LLP

(57) ABSTRACT

A base station performs communication of an orthogonal frequency division multiplexing (OFDM) scheme with a mobile station by using any one of equal to or greater than two frequency bands. The base station includes means that transmits a synchronization channel and a control channel using a band that includes a center frequency $f_A$ on a raster of a first band (20 MHz) and that has a bandwidth equal to or greater than that of a second band (5 MHz of the end). The control channel includes center frequency information for specifying a center frequency $f_A'$ of the second band. Since the mobile station moves to a desired band after obtaining center frequency information using a band including the center frequency on a raster, the mobile station can connect to the desired band without searching frequencies that are not on the raster.

22 Claims, 19 Drawing Sheets

FOREIGN PATENT DOCUMENTS

| | | |
|---|---|---|
| JP | 2005-130491 A | 5/2005 |
| TW | 511357 | 11/2002 |
| TW | 567660 | 12/2003 |
| WO | 03/028329 A2 | 4/2003 |

OTHER PUBLICATIONS

Written Opinion of International Searching Authority mailed Sep. 19, 2006, 3 pages.

"Physical Channel Concept for Scalable Bandwidth in Evolved UTRA Downlink" 3GPP TSG RAN WG1 Ad Hoc on LTE R1-050592, Jun. 2005, 14 pages.

"User Equipment (UE) Radio Transmission and reception (FDD)," 3GPP TS 25.101 V6.7.0, Mar. 2005, 123 pages.

Keiji Tachikawa, "W-CDMA Mobile Communication System", published by Maruzen K.K., pp. 35-45, Jun. 25, 2001 (32 pages).

Taiwanese Office Action for Taiwanese Application No. 95120999, mailed on Mar. 26, 2009 (5 pages).

esp@cenet patent abstract for Chinese Publication No. 1186401, Publication date Jul. 1, 1998 (1 page).

esp@cenet patent abstract for Taiwanese Publication No. 511357, Publication date Nov. 21, 2002 (1 page).

esp@cenet patent abstract for Taiwanese Publication No. 567660, Publication date Dec. 21, 2003 (1 page).

esp@cenet patent abstract for Chinese Publication No. 1516384, Publication date Jul. 28, 2004 (1 page).

Japanese Office Action for Application No. 2005-174399, mailed on Aug. 25, 2009 (4 pages).

US Office Action issued in U.S. Appl. No. 11/917,719, mailed Feb. 22, 2011, 18 pages.

* cited by examiner

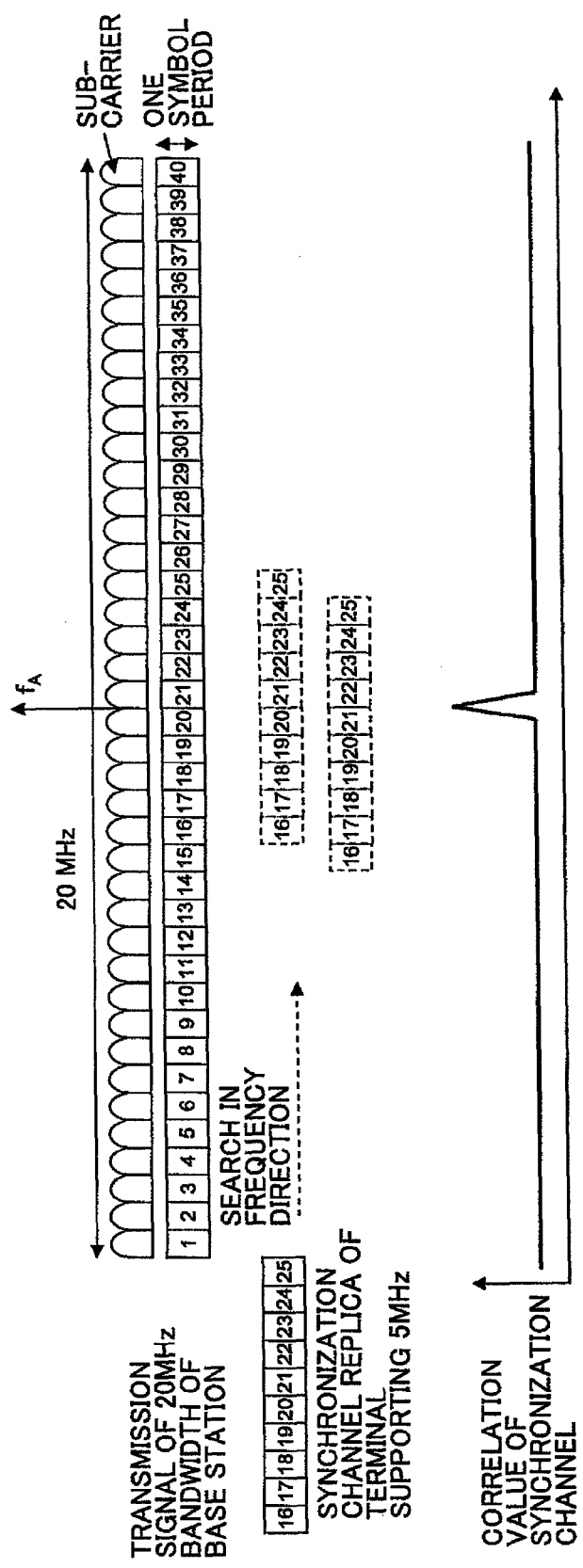

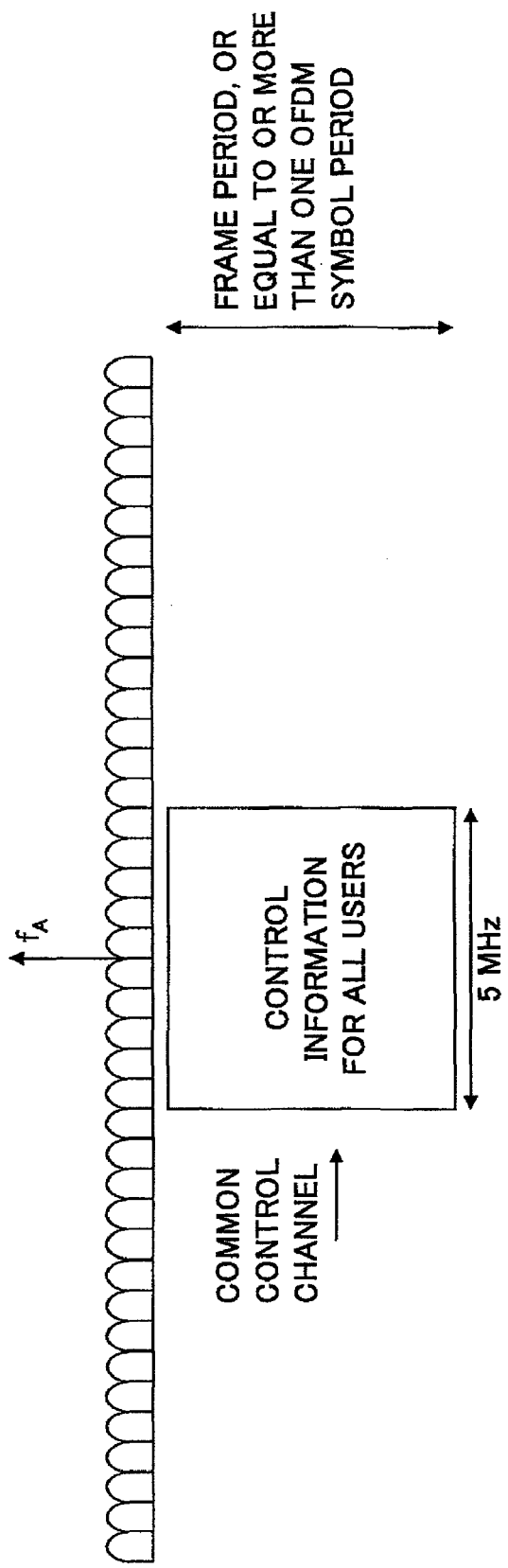

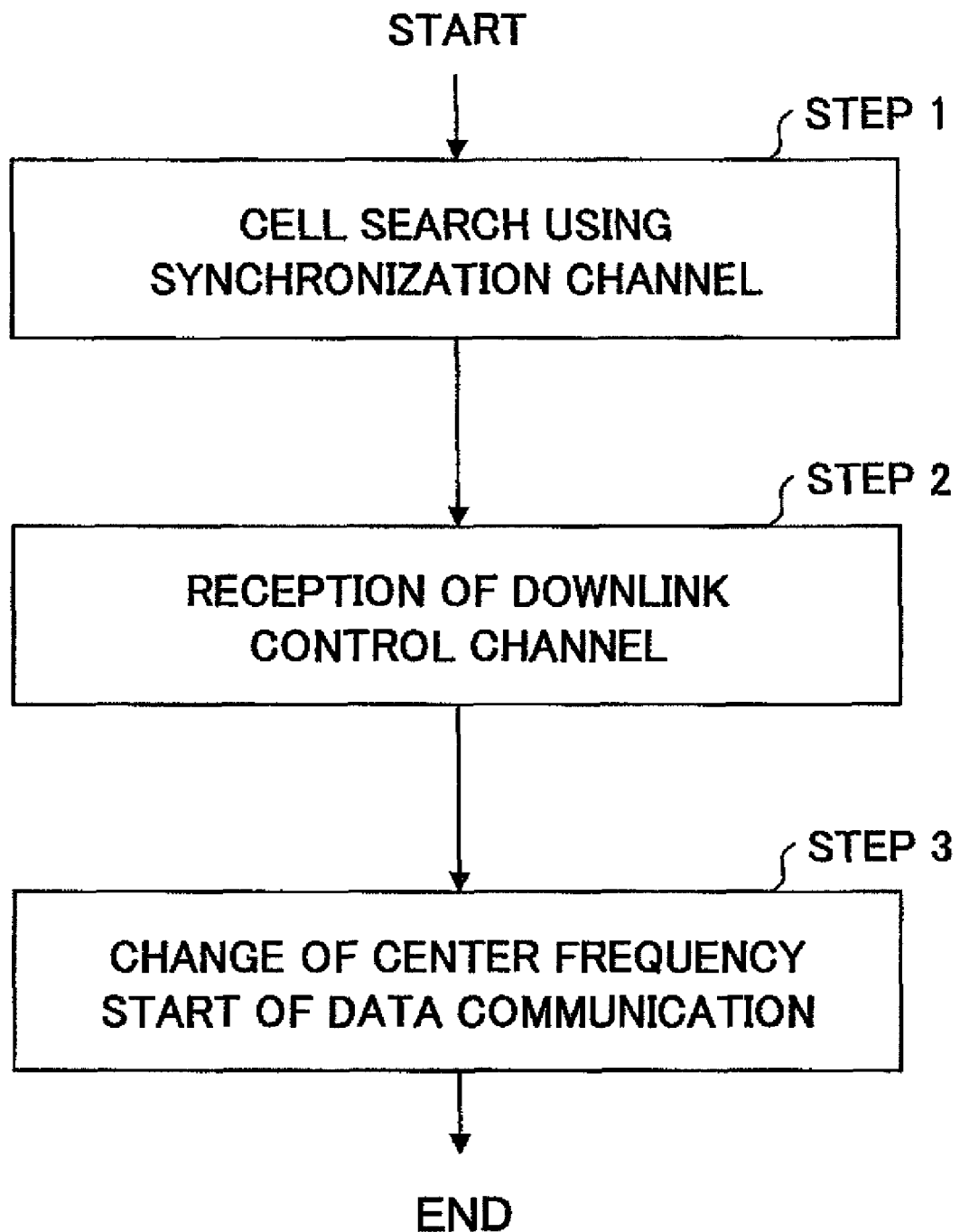

BASE STATION, MOBILE STATION AND METHOD

CROSS-REFERENCE TO RELATED APPLICATIONS

This is a continuation application of U.S. patent application Ser. No. 11/917,719 filed Dec. 14, 2007, which is a national stage application of PCT/JP2006/311877, which claims priority to JP2005/174399.

TECHNICAL FIELD

The present invention generally relates to a technical field of radio communication, and more particularly, relates to a base station, a mobile station and a method that can be used for a plurality of bands.

BACKGROUND ART

In existing communication systems related to a Wideband Code Division Multiple Access (W-CDMA) scheme and a GSM scheme and the like, a center frequency of a band used for communication is defined to agree with a predetermined frequency called a raster or a frequency raster. The frequency raster is arranged on a frequency axis at every 200 kHz, for example. Therefore, a mobile station searches frequency rasters on the frequency axis in series (searches for each 200 kHz) so as to specify the center frequency of the operator so that the mobile station can connect to a downlink. Following non-patent documents 1 and 2 describe downlink cell search.
[non-patent document 1] 3GPP, TS25.101, "User Equipment (UE) radio transmission and reception (FDD)", pp. 12-14
[non-patent document 2] Keiji Tachikawa, "W-CDMA mobile communication scheme", MARUZEN, pp. 35-45

DISCLOSURE OF THE INVENTION

Problem to be Solved by the Invention

By the way, a wireless communication system supporting an orthogonal frequency division multiplexing (OFDM) scheme that uses a plurality of wide and narrow bands is being studied. The reason for adopting the OFDM scheme is that it has a merit that it can effectively suppress multipath propagation interference and intersymbol interference and the like. In this radio communication system, consideration is given such that various operators can provide services, in which a wide band such as 20 MHz and a part (5 MHz, for example) of the band can be chosen according to apparatus configuration of the mobile station, apparatus configuration of the base station, application and the like.

FIG. 1 schematically shows spectrum on the radio communication system of the OFDM scheme having a plurality of bandwidths. In a cell A, communication of the OFDM scheme is performed in each of a wide bandwidth of 20 MHz and a narrow bandwidth of 5 MHz. The narrow bandwidth of 5 MHz is located at a right end of the wide bandwidth of 20 MHz on the frequency axis. Also in a cell B different from the cell A, communication of the OFDM scheme is performed using the bandwidth of 5 MHz. The band at the cell B is positioned apart from the band of 20 MHz of the cell A on the frequency axis. As mentioned above, frequency rasters are set at predetermined intervals on the frequency axis. In the example shown in the figure, the frequency rasters are set at every $\Delta_{raster}$ Hz starting from the point of X Mz on the left side. A center frequency $f_A$ of the band of 20 MHz of the cell A is positioned on a frequency raster $X+2\Delta_{raster}$. A center frequency $f_B$ of the band of 5 MHz of the cell B is positioned on a frequency raster $X+5\Delta_{raster}$.

On the other hand, a sub-carrier spacing is determined independently of the frequency raster, a spacing between frequency rasters is not necessarily an integral multiple of the sub-carrier spacing. Therefore, even when the center frequency $f_A$ of the wide frequency band of 20 MHz is positioned on a raster, it can be predicted that a center frequency $f_A'$ of a part of the band of 5 MHz is not always positioned on a raster. Therefore, it is feared that there is a problem in that a procedure for a mobile station that wants to use the frequency band of 5 MHz in the cell A to connect to a downlink and a process required for searching for a center frequency are complicated.

An object of the present invention is to provide a base station, a mobile station and a method that can make it easy to connect to a downlink signal in a mobile communication system in which communication of the OFDM scheme is performed using any one of more than one frequency band.

Means for Solving the Problem

In the present invention, a base station that performs communication of an OFDM scheme with a mobile station by using any one of equal to or greater than two frequency bands is used. The base station includes means that transmits a synchronization channel and a control channel using a band that includes a center frequency on a raster of a first band and that has a bandwidth equal to or greater than that of a second band. The control channel includes center frequency information for specifying a center frequency of the second band.

Effect of the Invention

According to the present invention, in a mobile communication system in which communication of an OFDM scheme is performed by using any one of equal to or greater than two frequency bands, it becomes easy to connect to a downlink signal.

BRIEF DESCRIPTION OF THE DRAWINGS

FIG. 5 is a diagram showing principle for detecting a center of the band;
FIG. 6 is a diagram showing a configuration example of a control channel;
FIG. 7A is a diagram showing a flowchart of operation according to an embodiment of the present invention.

DESCRIPTION OF REFERENCE SIGNS

Figure 1:
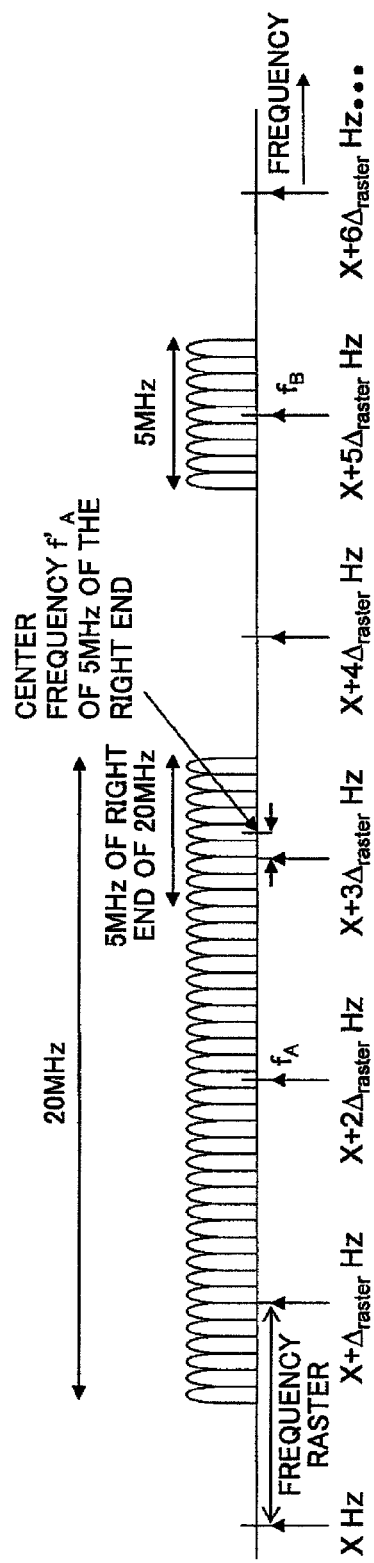
FIG. 1 schematically shows spectrum on a radio communication system of an OFDM scheme having a plurality of bandwidths.

MUX multiplexing unit
FFT fast Fourier transform unit
IFFT inverse fast Fourier transform unit
GI guard interval inserting unit or removing unit
RF radio unit

PREFERRED EMBODIMENTS FOR CARRYING OUT THE INVENTION

According to an embodiment of the present invention, a synchronization channel is transmitted from the base station to the mobile station using a band that includes a center frequency $f_A$ on a raster of a first band (20 MHz) and that has a bandwidth equal to or greater than that of a second band (5 MHz of the end). Using a band near the center, a control channel that includes center frequency information for specifying a center frequency $f_A'$ of the second band is transmitted from the base station to the mobile station. Since the mobile station moves to a desired band after obtaining center frequency information using a band including the center frequency on a raster, the mobile station can connect to the desired band without searching frequencies that are not on the raster.

The synchronization channel and the control channel may be transmitted using a band that includes the center frequency on the raster of the first band and that has a bandwidth same as that of the second band. Accordingly, the mobile station can fairly connect to a downlink irrespective of bandwidths to be used. The synchronization channel and/or the control channel may be transmitted using the whole of the first band. Accordingly, information that is different according to the bandwidth used for communication can be included in the control channel.

The synchronization channel may be mapped in the frequency direction at intervals each wider than a sub-carrier spacing. Since other information can be assigned to sub-carriers where the synchronization channel is not mapped, information transmission efficiency can be improved.

The control channel may be coded using two-dimensional scrambling code that is mapped to the band that includes the center frequency on the raster of the first band and that has a bandwidth equal to or greater than that of the second band in two-dimensional scrambling code that is mapped over the first band and equal to or greater than one transmission time interval. Accordingly, the mobile station can demodulate the control channel without switching scrambling code after synchronization is established.

Basic control information that is transmitted using the band that includes the center frequency on the raster of the first band and that has a bandwidth same as that of the second band may include control information common to any mobile station using any band, and control information that is transmitted using a third band other than the second band may include control information specific to a mobile station that uses the third band.

A mobile station according to an embodiment of the present invention includes: means that receives a downlink signal transmitted using any one of equal to or greater than two frequency bands; means that detects a synchronization channel and a control channel transmitted from a base station using a band that includes a center frequency on a raster of a first band and that has a bandwidth equal to or greater than that of a second band; means that extracts center frequency information from the control channel; and means that changes a frequency band for receiving a signal according to the center frequency information.

Embodiment 1

Figure 2:
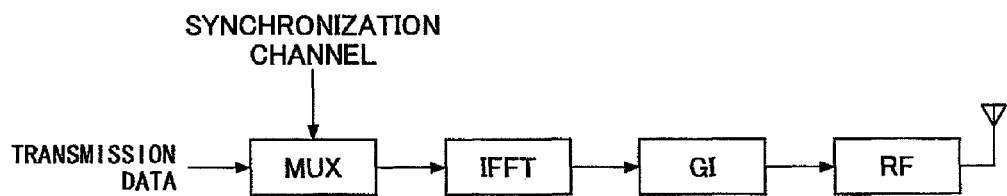
FIG. 2 shows a block diagram of a transmitter according to an embodiment of the present invention.

FIG. 2 schematically shows a transmitter according to an embodiment of the present invention. The transmitter is typically provided in a base station. The transmitter includes a multiplexing unit (MUX) for multiplexing transmission data and a synchronization pattern, an IFFT unit for performing inverse fast Fourier transform on the multiplexed data, a guard interval adding unit (GI) for adding a guard interval to a signal, on which the inverse Fourier transform has been performed, modulated by the OFDM scheme, and for outputting symbols to be transmitted, and a radio unit (RF) for converting a signal format of the symbols to be transmitted to a signal format for transmission using a radio frequency.

Figure 3:
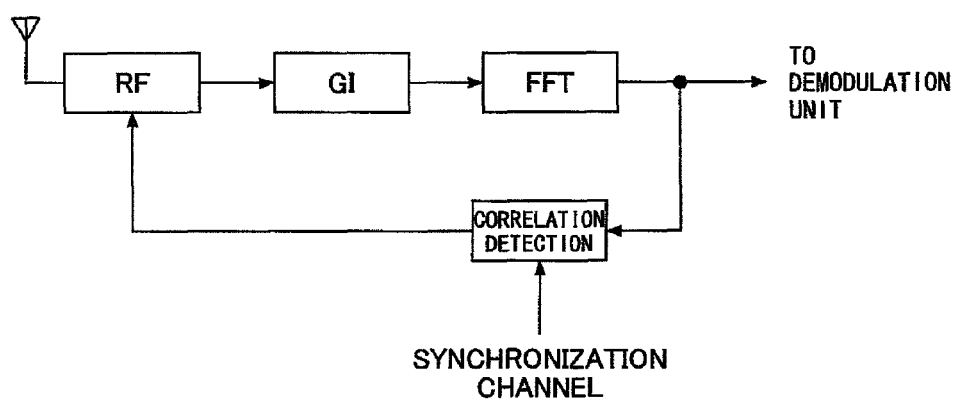
FIG. 3 shows a block diagram of a receiver according to an embodiment of the present invention.

FIG. 3 shows a block diagram of a receiver according to an embodiment of the present invention. The receiver is typically provided in a mobile station. The receiver includes a radio unit (RF) for converting a signal received by an antenna to a symbol of a digital format, a guard interval removing unit (GI) for removing the guard interval from the symbol to output an effective symbol, a FFT unit for performing fast Fourier conversion on the data of the effective symbol to perform modulation of the OFDM scheme, and a correlation detection unit for calculating correlation between the data modulated in the OFDM scheme and a predetermined synchronization pattern to detect a correlation peak.

Figure 4:
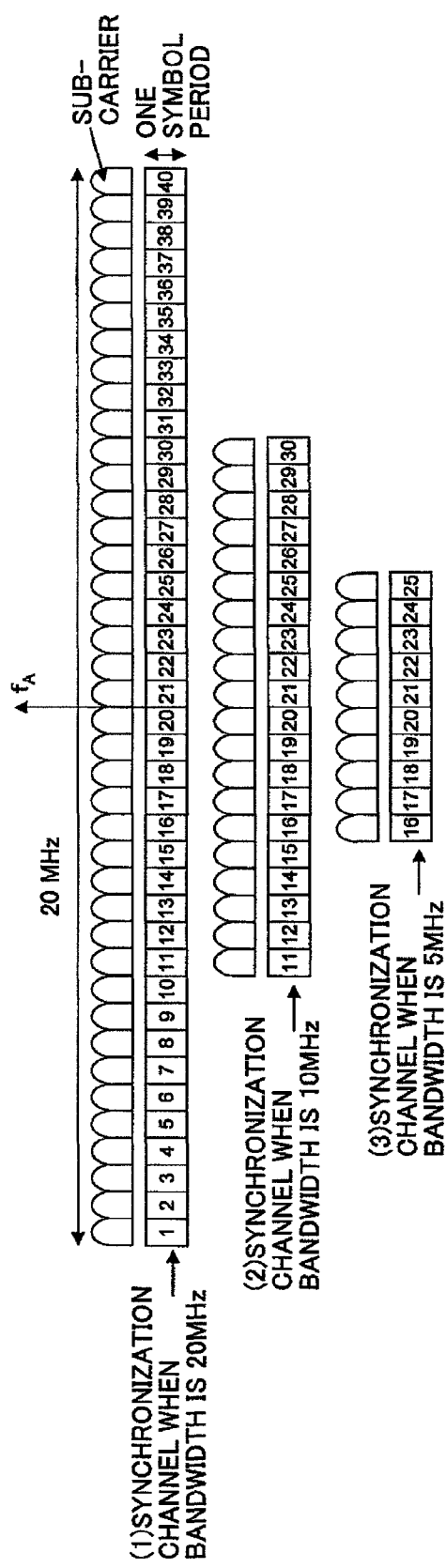
FIG. 4 is a diagram showing a mapping example of a synchronization channel.

FIG. 4 shows mapping examples of a synchronization channel that is multiplexed in the multiplexing unit shown in FIG. 2. The base station and the mobile station can perform communication in any of various wide and narrow frequency bands, and the example shown in the figure shows mapping examples of the synchronization channel when 20 MHz, 10 MHz or 5 MHz is used for the communication. When the base station uses a bandwidth of 20 MHz, the transmitter of the base station maps the data of the synchronization channel onto entire sub-carriers. For simplicity, although 40 sub-carriers are shown for 20 MHz, more sub-carriers exist actually. In the figure, each number of 1-40 shows a phase of code. When the synchronization channel indicates a synchronization pattern using data sequence of $d_1, d_2, \ldots, d_{40}$, the data sequence is arranged in a frequency axis direction and is mapped to each sub-carrier. In the figure, the number "1", "2", . . . correspond to $d_1, d_2, \ldots$ respectively.

When the base station uses the band of 20 MHz and also the mobile station uses the same band of 20 MHz, the mobile station can easily find a center frequency of the band of 20 MHz by cell search so that the mobile station can connect to a downlink to perform communication after that. When the mobile station uses a band of 5 MHz whose center frequency is different from that of the band of 20 MHz, following operation is performed. The mobile station supplies a synchronization pattern of $d_{16}, d_{17}, \ldots, d_{25}$ to the correlation detection unit shown in FIG. 3. By doing so, as shown in FIG. 5, the mobile station can detect the center frequency $f_A$ of the band of 20 MHz. The correlation detection unit performs correlation calculation by shifting the phase between the received signal and a replica of the synchronization channel $d_{16}, d_{17}, \ldots, d_{25}$, so that a frequency by which the correlation value reaches its peak is detected. In the correlation calculation, even when they are displaced only by one sub-carrier, the correlation value becomes small. Accordingly, the center of the band can be detected accurately. As the synchronization pattern, PN code sequence, Gold code sequence and other various sequences can be used. This is because it is only necessary that a peak can be obtained and the position can be identified by performing correlation calculation.

In the present example, in a cell where a mobile station using a band of 5 MHz resides, bandwidths of 20 MHz, 10 MHz and 5 MHz are prepared so that the mobile station can use any of them. In addition to that the base station can perform transmission by mapping the synchronization channel onto entire sub-carriers as shown in FIG. 4(1), the base station transmits control information for all users (common control channel) using a band of 5 MHz centered on the center frequency $f_A$ as shown in FIG. 6. As described being related to FIG. 5, a mobile station using the band of 5 MHz can also detect the center frequency $f_A$, and the mobile station can properly demodulate the control channel transmitted using the band of 5 MHz centered on the frequency $f_A$. The common control channel includes center frequency information that can specify a position of a center frequency $f_A'$ (that is not normally positioned on a raster) of the band of 5 MHz that uses a part of the band of 20 MHz. The center frequency information may include information indicating how far the frequency $f_A'$ is apart from the frequency $f_A$ on the raster, for example. The mobile station demodulates the common control channel, reads the center frequency information, adjusts a frequency synthesizer in the radio unit (such as the RF unit shown in FIG. 3), so as to adjust the center of the band of 5 MHz received by the mobile station to the frequency $f_A'$. After that, the mobile station can communicate a data channel and the like using 5 MHz that is on the right end of the band of 20 MHz.

Figure 7B:
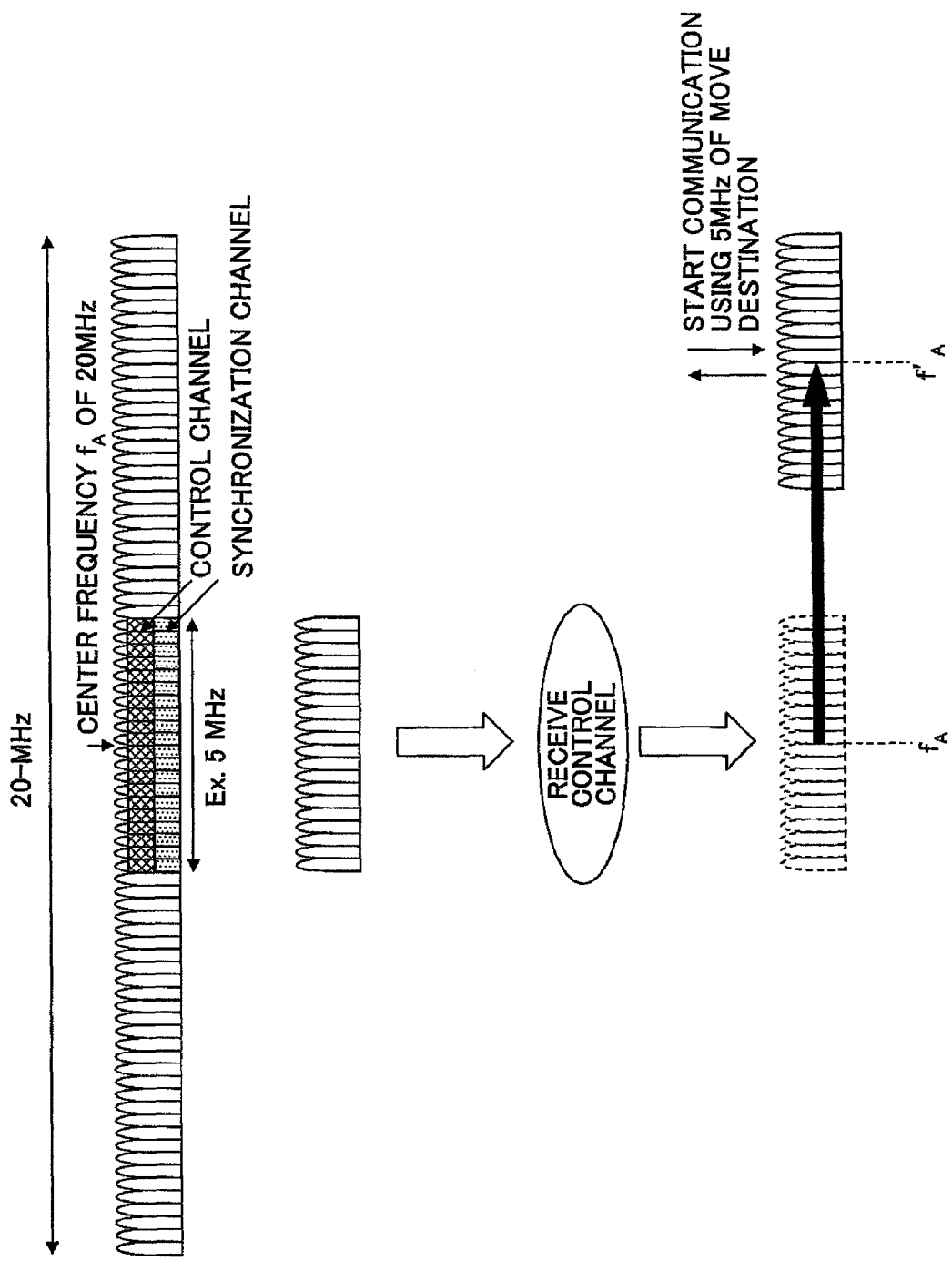
FIG. 7B is a diagram showing operation on a frequency axis according to an embodiment of the present invention.

FIG. 7A shows a flowchart of operation according to an embodiment of the present invention. FIG. 7B schematically shows a situation in which the mobile station connects to a downlink according to the flow. An operation example is described by referring to both of the figures. A control channel and a synchronization channel are transmitted from the base station using the band (central band) of 5 MHz including the center frequency of the band of 20 MHz. The control channel and the synchronization channel are configured to have a pattern common to any mobile station regardless of bandwidths to be used for communication by the mobile station (regardless of bandwidths such as 5 MHz, 10 MHz, 20 MHz and the like). In step 1, the synchronization channel and the control channel are transmitted from the base station, and the mobile station receives the synchronization channel by performing cell search to establish synchronization. In step 2, the mobile station receives the control channel and demodulates it so as to read frequency information. The frequency information includes information on frequency band assigned to the mobile station (such as shift amount between central band and band (use permitted band) permitted to use). The frequency information may include base station information indicating that the bandwidth of the cell is 20 MHz (this is not essential). In step 3, the mobile station adjusts a frequency for receiving signals to a band permitted to use reported by the control channel so as to change the band for communication. After that, the mobile station starts data communication using the use permitted band (having a bandwidth of 5 MHz, for example). As mentioned above, the center frequency $f_A$ of the central band is positioned on the raster, but the center frequency $f_A'$ of the use permitted band is not necessarily positioned on the raster. Therefore, it is not easy that the mobile station detects the center frequency of the use permitted band without the above-mentioned frequency information. Any mobile station can easily detect the center frequency on the raster of the central band and can demodulate the control channel. Thus, the mobile station can easily shift the center frequency of communication to a desired frequency that is not on the raster.

As shown in FIG. 7, the mobile station that uses 5 MHz detects the center frequency $f_A$ of the band of 20 MHz first, and receives the common control channel that is transmitted using the central band of 5 MHz. It is necessary that the base station prepares such a control channel as transmission data and adds it to the synchronization channel to transmit them to the mobile station under the base station. The mobile station moves to the band of 5 MHz on the right end that is permitted to use according to instruction information of the control channel. After that, communication is performed using the moved band.

Figure 8:
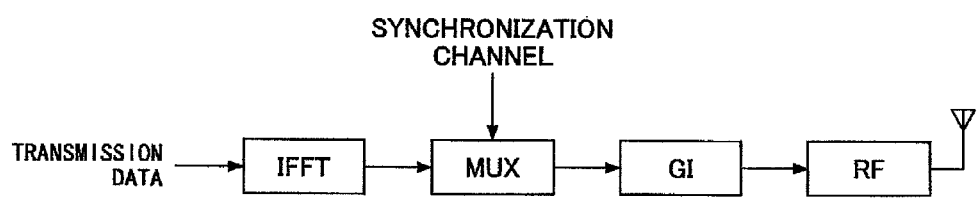
FIG. 8 is a block diagram of a transmitter according to an embodiment of the present invention.
Figure 9:
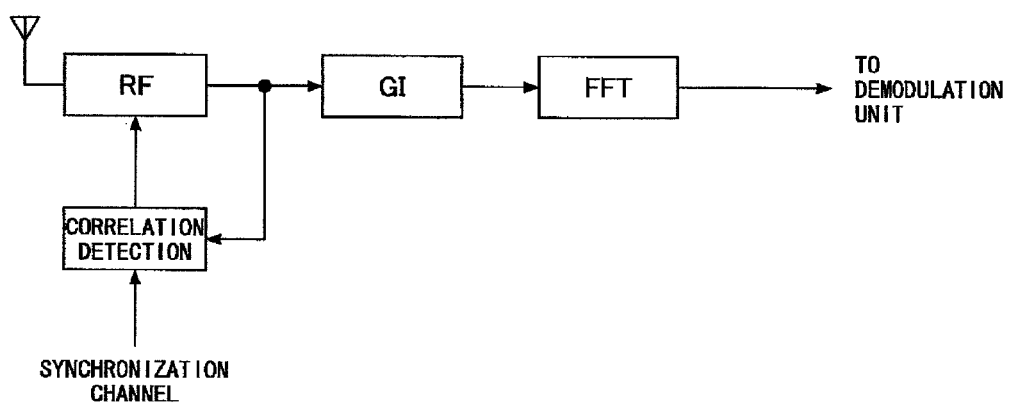
FIG. 9 is a block diagram of a receiver according to an embodiment of the present invention.

By the way, in the examples of FIGS. 2 and 3, although the synchronization channel is multiplexed and demultiplexed in the frequency domain, multiplexing and demultiplexing may be performed in a time domain as shown in FIGS. 8 and 9. This is because it is only necessary that the mobile station can detect the center of the band of 20 MHz and can demodulate the control channel.

Embodiment 2

Figure 10:
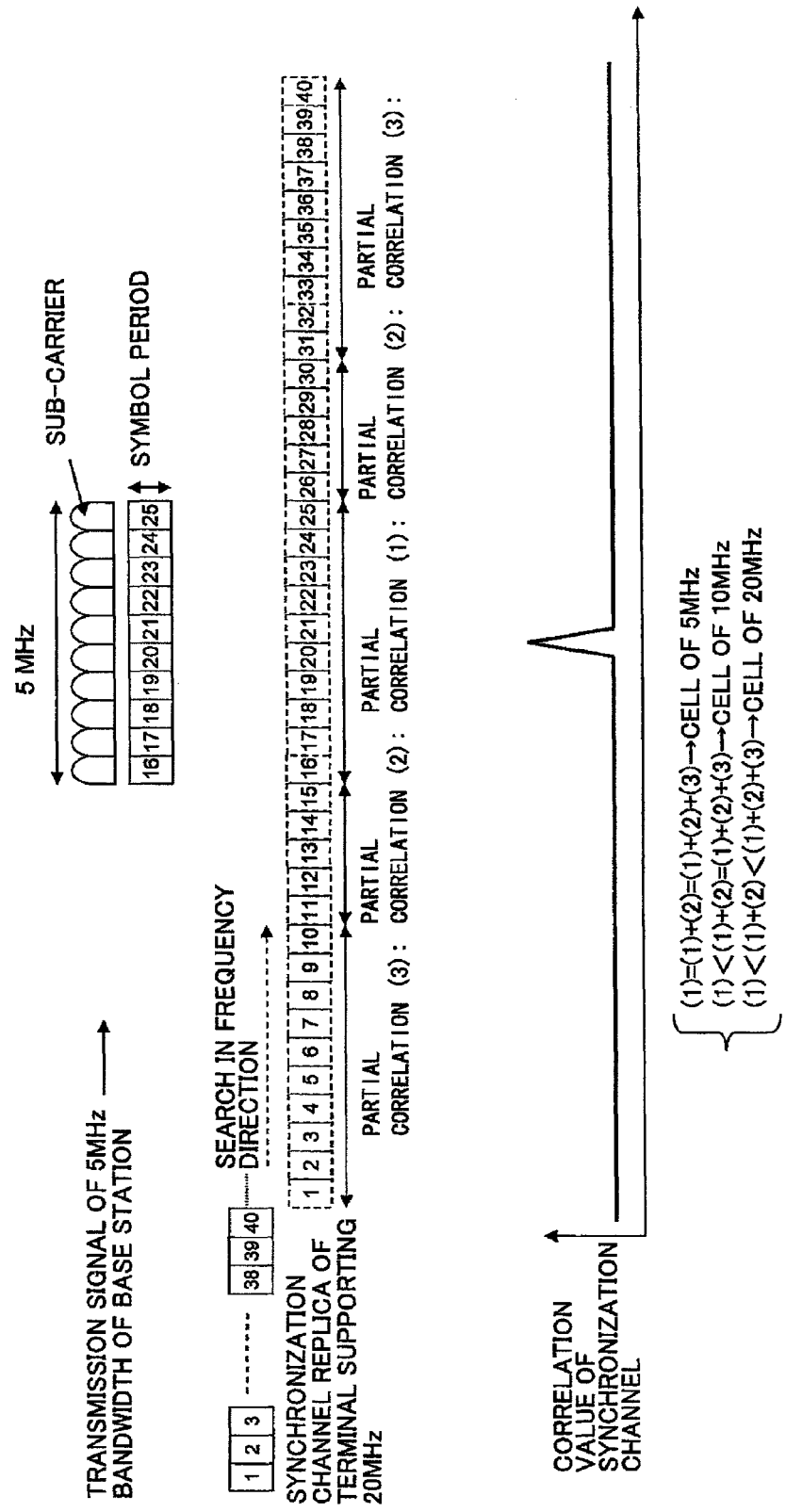
FIG. 10 shows principle for detecting the center of the band.

FIG. 10 also shows a mapping example of the synchronization channel. But, in the example of FIG. 10, although the base station can perform communication only in a band of 5 MHz, the mobile station has a capability that can use a band of 20 MHz. In this case, the mobile station cannot perform communication using the entire band of 20 MHz. As shown in FIG. 4 (3), the base station transmits, to the mobile station under the base station, a data sequence having 10 pieces of data such as $d_{16}, d_{17}, \ldots d_{25}$ that are a part of the data sequence of 40 pieces of data as a pattern of the synchronization channel. The mobile station prepares the data sequence of 40 pieces of data such as $d_1, d_2, \ldots, d_{40}$ shown in FIG. 4 (1), calculates correlation between the sequence and the received signal to detect a peak position. As shown in FIG. 10, the mobile station detects the center frequency $f_A$ of the band of 5 MHz to establish synchronization, and receives the control channel transmitted using the band, and ascertains that the base station can perform communication only by 5 MHz.

Which band the base station uses for communication may be announced by the downlink control channel, or it may be determined in the mobile station as described in the following example. As an example, the mobile station derives three kinds of correlation values as shown in FIG. 10. A first correlation value is a correlation value on a data sequence of $d_{16}\sim d_{25}$ near the center. A second correlation value is a correlation value on a data sequence of $d_{11}\sim d_{30}$ in which both sides are added to the data sequence of $d_{16}\sim d_{25}$ near the center, and a third correlation value is a correlation value on the data sequence of $d_1\sim d_{40}$ over the entire region. For example, when the base station transmits the synchronization channel only in the band of the 5 MHz like the above-mentioned example, each of the first, second and third correlation values indicates a same size of peak. However, when the base station transmits the synchronization channel using the band of 10 MHz as shown in FIG. 4(2), the first correlation value is smaller than the second correlation value, and the size of the second correlation value is almost the same as the size of the third correlation value. The reason is that, the longer the data sequence is, the larger the peak of the correlation value is. In addition, when the base station transmits the synchronization channel using the entire band of 20 MHz, the first, the second and the third correlation values are obtained in order of increasing size. Therefore, by calculating the first to third correlation values and comparing them, the band of the base station can be specified.

Embodiment 3

Figure 11:
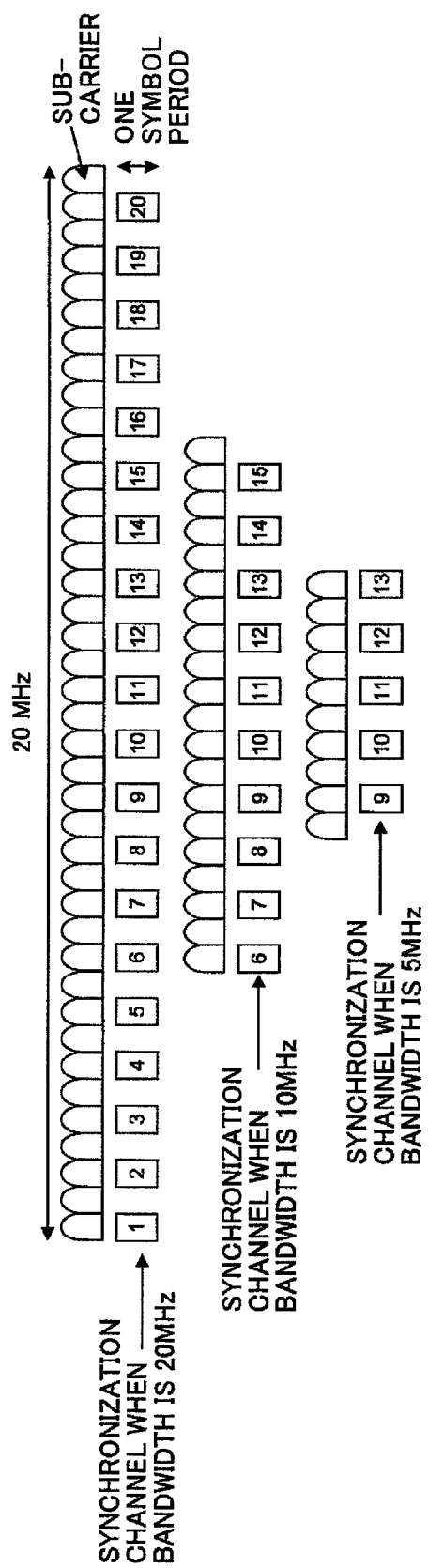
FIG. 11 is a diagram showing another mapping example of the synchronization channel.
Figure 12:
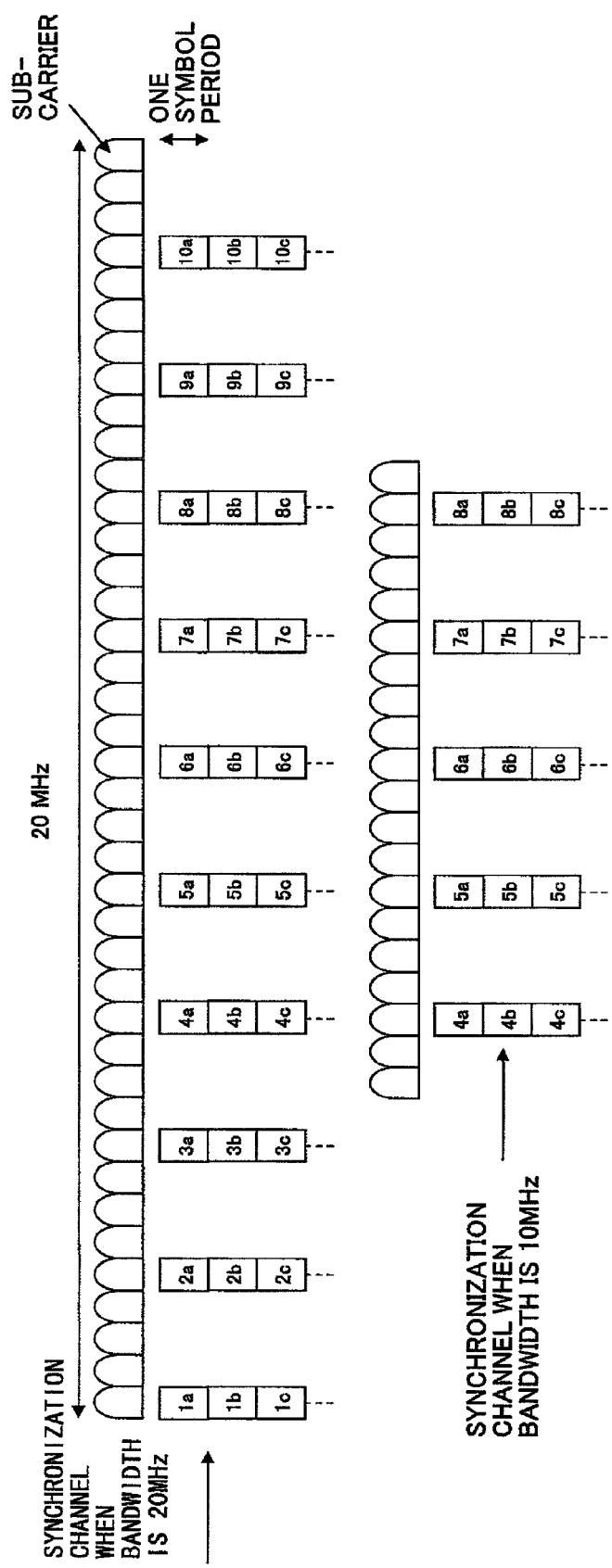
FIG. 12 is a diagram showing still another mapping example of the synchronization channel.

FIG. 11 shows another mapping example of the synchronization channel. As long as synchronization is maintained in the mobile station, the synchronization channel is not necessarily inserted into the entire region of the band that is used. In the example of the figure, the synchronization channel is intermittently inserted at every two sub-carriers in the frequency axis direction. In addition, the synchronization channel may be inserted not only in the frequency axis direction but also in the time axis direction as shown in FIG. 12. Anyway, since another signal can be mapped onto sub-carriers to which the synchronization channel is not inserted, mapping amount of synchronization channel can be limited to a minimum amount so that information transmission rate can be improved.

Figure 13:
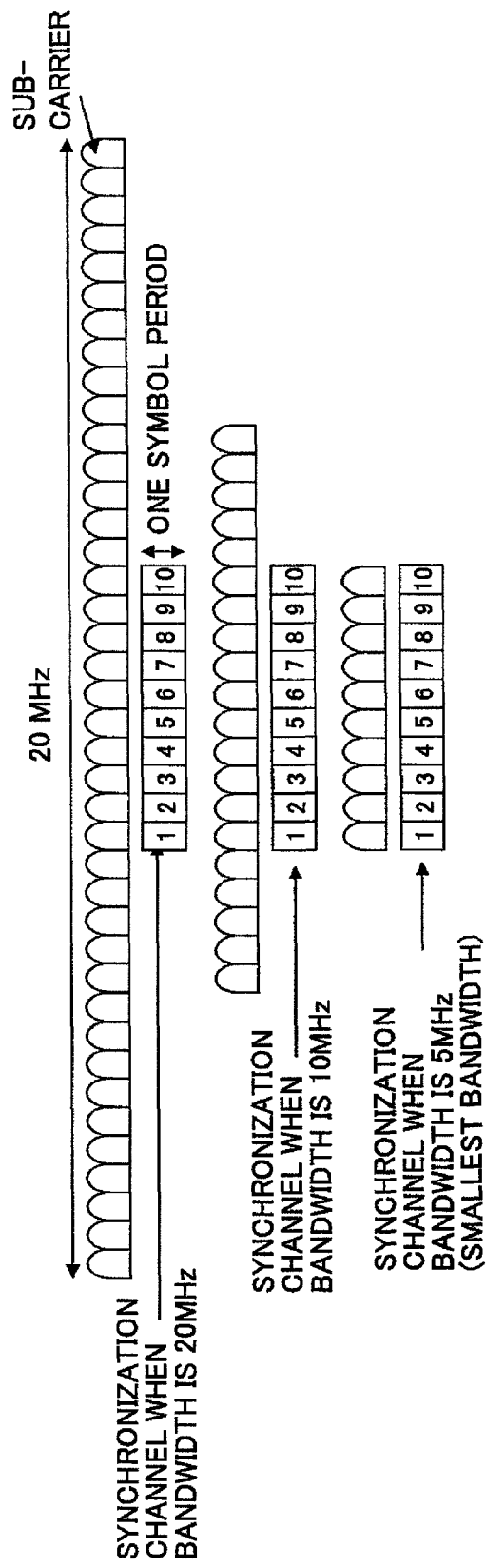
FIG. 13 is a diagram showing still another mapping example of the synchronization channel.

As mentioned above, the mapping pattern of the synchronization channel may be different according to the bandwidth supported in the cell, or the synchronization channel may be transmitted using a same bandwidth near the center regardless of the band by which the mobile station performs communication as shown in FIG. 13. In this case, as described in FIG. 10, it may become difficult that the mobile station determines the band of the base station. However, from the viewpoint of equalizing cell detection accuracy irrespective of bandwidth that is used, it is desirable that the band to which the synchronization channel is inserted is common.

Figure 14:
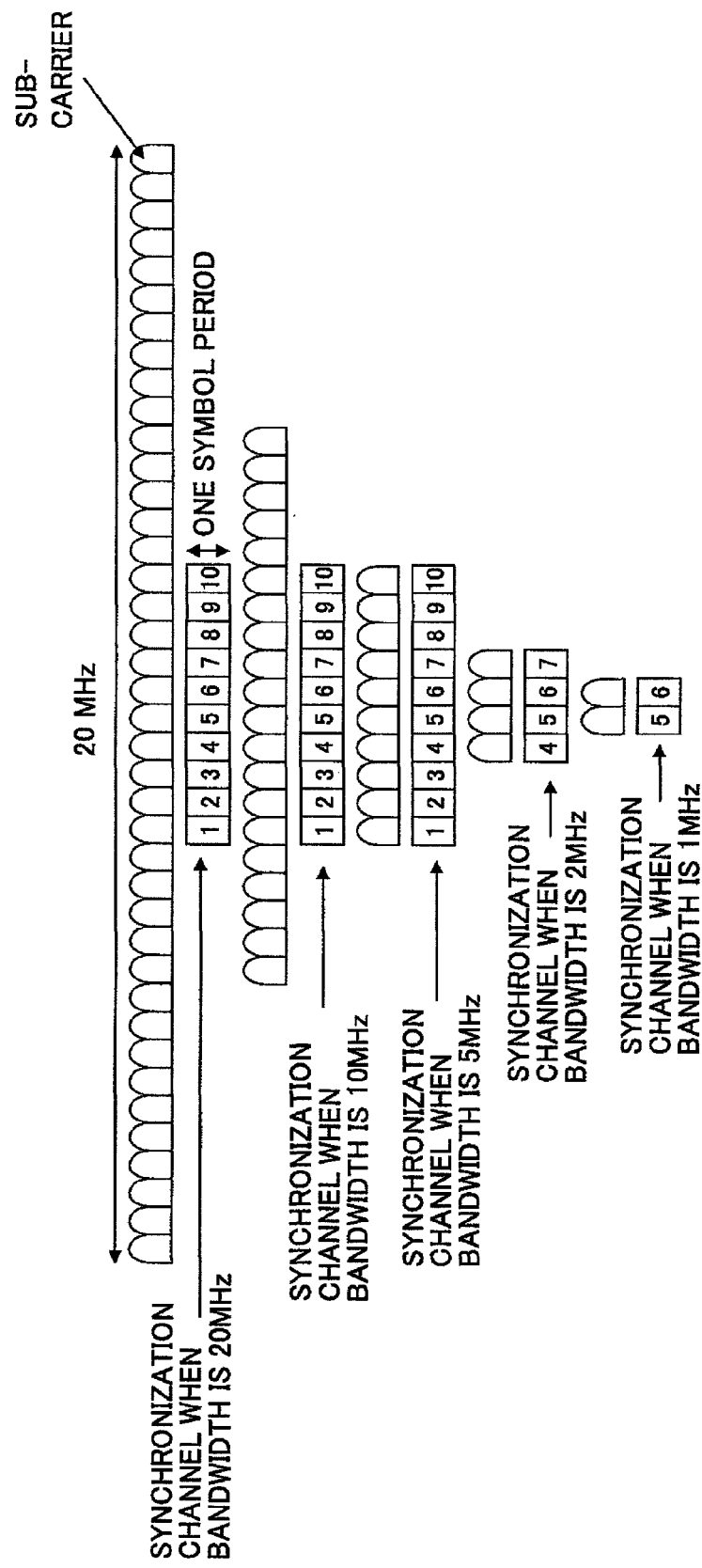
FIG. 14 is a diagram showing still another mapping example of the synchronization channel.

FIG. 14 shows an example in which, the synchronization channel is transmitted using 5 MHz when a band equal to or greater than 5 MHz is used, and mapping of the synchronization channel is different according to bandwidths when a band narrower than 5 MHz is used. If fairness of cell detection accuracy is required even when there are significantly wide and narrow bands in bands that can be used, it is feared that enough cell detection accuracy cannot be adequately obtained when using a wideband. The reason is that the synchronization channel configuration of the case of wideband becomes largely different from optimum one. In this case, by adopting the configuration shown in FIG. 14, both of the cell detection accuracy and fairness can be considered.

Embodiment 4

Figure 15:
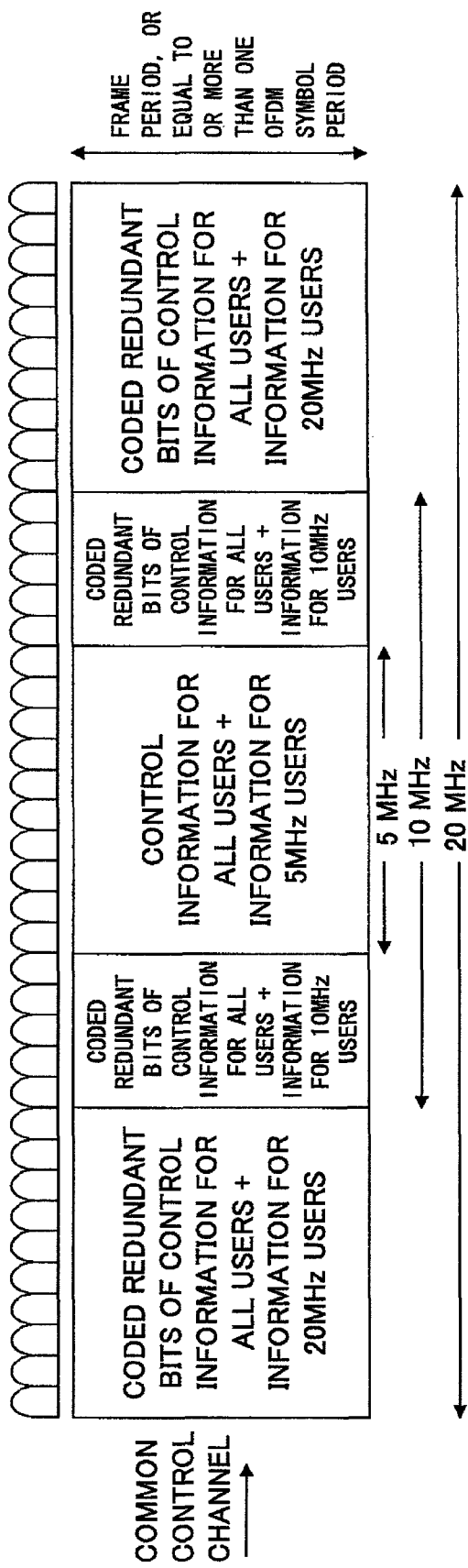
FIG. 15 is a diagram showing another configuration example of the control channel.

FIG. 15 shows a configuration of a common control channel that is different from the common control channel shown in FIG. 6. In the configuration example of FIG. 15, a first band of 5 MHz that is the center includes control information for all users and control information for users using the band of 5 MHz. The latter control information includes center frequency information indicating relationship etc. between the center frequency $f_A$ and the center frequency $f_A{'}$ of the band to be used. In a second band that is both sides of the first band each being 2.5 MHz, redundant information of the control information for all users and control information for users using a band of 10 MHz are transmitted. The former redundant information is represented as redundant bits derived according to various algorithms of error correction coding that are performed on the control information. The latter control information includes center frequency information and the like for users using the band of 10 MHz. In a third band that is both sides of the second band, control information and redundant information for all users and control information for users using a band of 10 MHz are transmitted. By transmitting the control information and the like by dispersing it according to bands used by the user, transmission contents of the control channel can be changed according to classes of the mobile station, for example.

Embodiment 5

Scrambling code specific to a base station may be applied to a control channel and a data channel that are transmitted from the base station in addition to the synchronization channel. In this case, if scrambling code is set independently for each bandwidth used for communication, processes for the mobile station to decode a control channel after synchronization is established may become complicated. In the present embodiment, scrambling code is determined using an entire or a part of two-dimensional code defined in a predetermined period and in the entire region of the band of 20 MHz.

Figure 16:
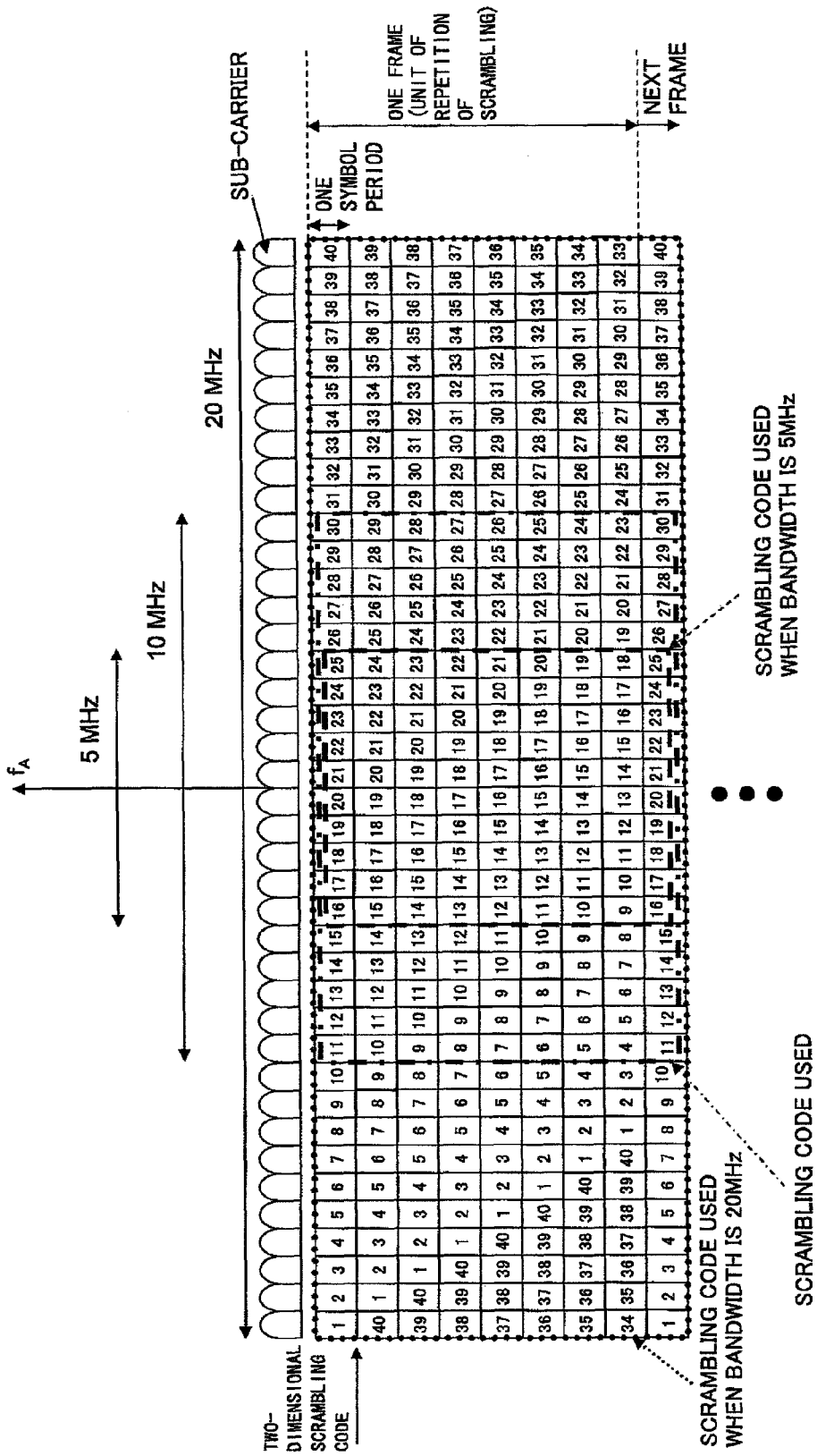
FIG. 16 is a diagram showing an example of scrambling code by which a control channel is multiplied.

FIG. 16 is a figure showing an example of scramble code by which a control channel and the like is multiplied. In the example shown in the figure, two-dimensional code covering 40 sub-carriers in the frequency direction and 8 symbols in the time direction is defined first. Adjacent symbols are shifted in phase by one sub-carrier with each other in the frequency axis direction. When the base station transmits the control channel and the like using the entire band of 20 MHz, the control channel is multiplied by the whole scrambling code, and is transmitted. When the base station uses only the band of 5 MHz, scrambling code mapped to the band of 5 MHz including the center frequency $f_A$ is used. When the base station uses only the band of 10 MHz, scrambling code mapped to the band of 10 MHz including the center frequency $f_A$ is used. Therefore, the mobile station can demodulate the control channel without switching scrambling code after synchronization is established so as to be able to connect to the downlink easily.

Figure 17:
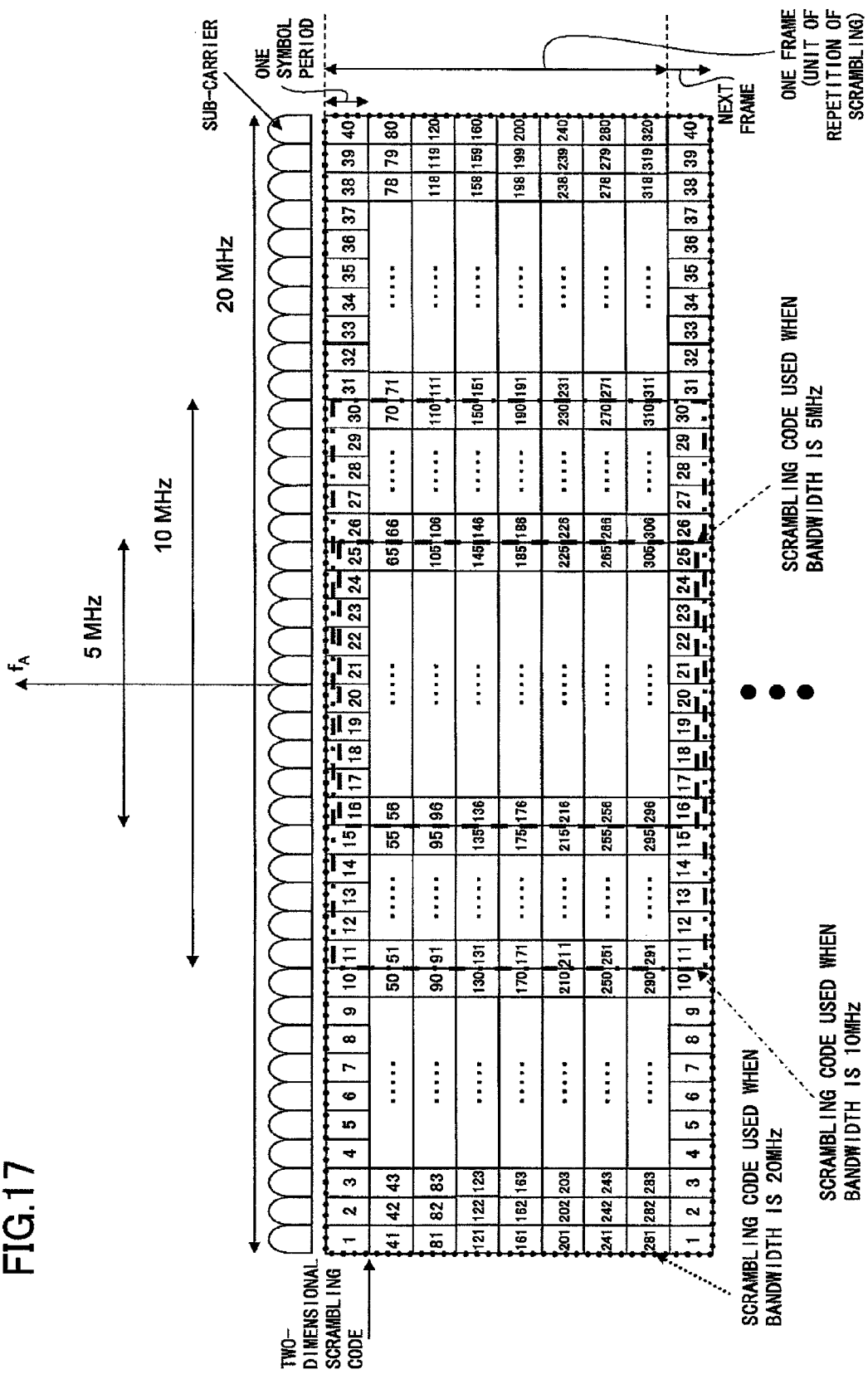
FIG. 17 is a diagram showing an example of scrambling code by which a control channel is multiplied.

The two-dimensional code over the entire band of 20 MHz and 8 symbols may not be a repetition pattern shown in FIG. 16. FIG. 17 shows a case in which the two-dimensional code is prepared by a series of data sequences which is not the repetition pattern. Also by using such two-dimensional code, effect the same as those above-mentioned can be obtained.

Embodiment 6

Figure 18:
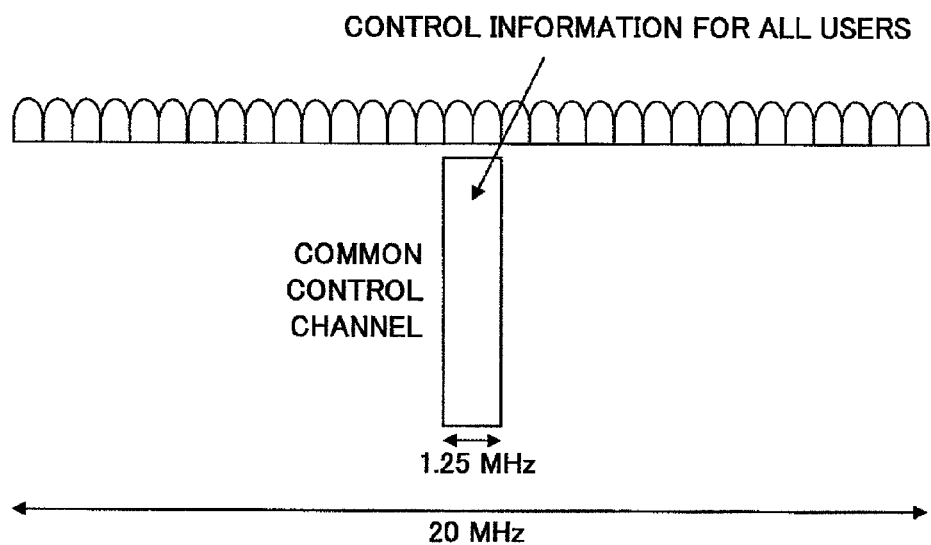
FIG. 18 is a diagram showing a configuration example of the control channel.
Figure 19:
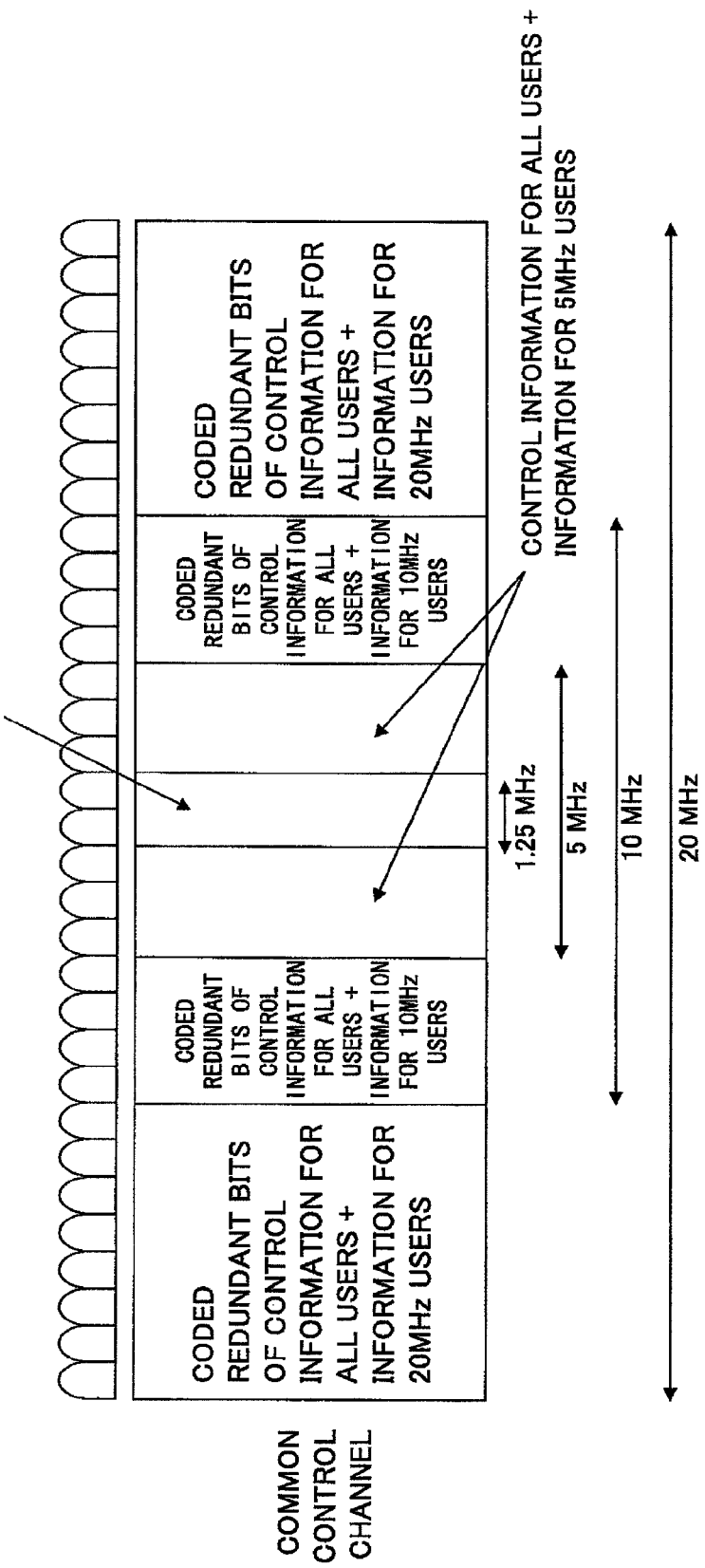
FIG. 19 is a diagram showing another configuration example of the control channel.
Figure 20:
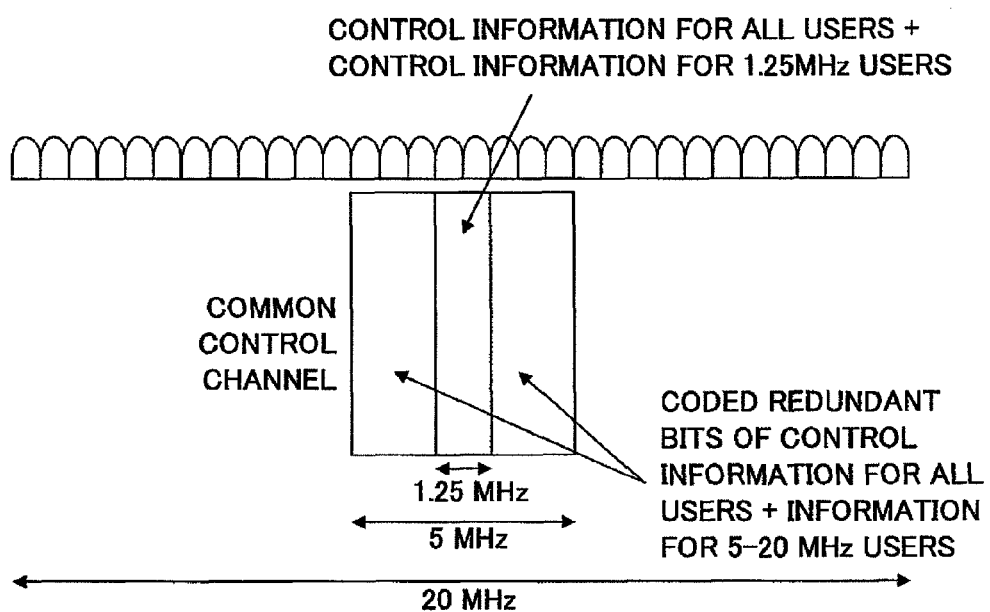
FIG. 20 is a diagram showing still another configuration example of the control channel.

In the first embodiment and the like, a minimum bandwidth of a use band of the mobile station is 5 MHz, and the synchronization channel and the control channel are transmitted using a central band of 5 MHz. However, the synchronization channel and the control channel may be transmitted using a bandwidth other than 5 MHz. In the example shown in FIG. 18, a band usable for the mobile station is 1.25 MHz, and the central band is 1.25 MHz. FIG. 19 is similar to FIG. 15 in the fourth embodiment, but is different in that the minimum bandwidth of the center is 1.25 MHz. In addition, by combining the configuration examples shown in FIGS. 18 and 19, the control channel may be transmitted using a band of 1.25 MHz and a central band of 5 MHz. Accordingly, fairness among mobile stations can be considered while providing effect of wideband (improvement of quality of control channel and the like) for users using a bandwidth equal to or greater than 5 MHz.

As mentioned above, preferred embodiments of the present invention are described. But, the present invention is not limited to these embodiments. Variations and modifications can be made within the scope of the present invention. Although the present invention is described by classifying it into several embodiments for the sake of convenience of explanation, the classification into each embodiment is not essential, and one or more embodiment may be used as necessary.

The present application claims priority based on Japanese patent application No. 2005-174399, filed in the JPO on Jun. 14, 2005 and the entire contents of it are incorporated herein by reference.

The invention claimed is:

1. A base station apparatus, wherein a plurality of types of bandwidths are defined for use in a communication system, the base station apparatus comprising:
a transmission unit configured to transmit transmission data by using a bandwidth of the plurality of types of bandwidths in a band centered on a predetermined center frequency; and
a multiplexing unit configured to multiplex a synchronization channel into a center band of a predetermined width including the center frequency of the band used in the transmission unit irrespective of the bandwidth used in the transmission unit.

2. The base station apparatus as claimed in claim 1, wherein the multiplexing unit multiplexes the synchronization channel only into the center band, the center band comprising a plurality of subcarriers that use orthogonal frequency-division multiplexing (OFDM).

3. The base stations apparatus as claimed in claim 1, wherein the multiplexing unit multiplexes a control channel into the center band.

4. The base station apparatus as claimed in claim 3, wherein the control channel to be multiplexed in the multiplexing unit includes information for specifying the bandwidth used in the transmission unit.

5. The base station apparatus as claimed in claim 1, wherein the transmission unit uses a bandwidth from among equal to or greater than three types of defined bandwidths.

6. The base station apparatus as claimed in claim 1, wherein a plurality of candidates of bandwidths that can be used in the transmission unit are respectively defined as the maximum bandwidths that can be used by the base station apparatus.

7. A base station apparatus, wherein a plurality of types of bandwidths are defined for use in a communication system, the base station apparatus comprising:
a transmission unit configured to transmit transmission data by using a bandwidth of the plurality of types of bandwidths in a band centered on a predetermined center frequency; and
a multiplexing unit configured to multiplex a control channel into a center band of a predetermined width including the center frequency of the band used in the transmission unit irrespective of the bandwidth used in the transmission unit,
wherein the multiplexing unit multiplexes a synchronization channel into the center band.

8. The base station apparatus as claimed in claim 7, wherein the multiplexing unit multiplexes the control channel only into the center band.

9. A transmission method, wherein a plurality of types of bandwidths are defined for use in a communication system, the transmission method comprising the steps of:
transmitting downlink transmission data by using a bandwidth of the plurality of types of bandwidths in a band centered on a predetermined center frequency; and
multiplexing a synchronization channel into a center band of a predetermined width including the center frequency of the band irrespective of the bandwidth to be used.

10. The transmission method as claimed in claim 9, wherein the step of multiplexing includes multiplexing the synchronization channel only into the center band, the center band comprising a plurality of subcarriers that use orthogonal frequency-division multiplexing (OFDM).

11. The transmission method as claimed in claim 9, wherein the step of multiplexing includes multiplexing a control channel into the center band.

12. The transmission method as claimed in claim 11, wherein the control channel to be multiplexed in the step of multiplexing includes information for specifying the bandwidth used in the step of transmitting.

13. The transmission method as claimed in claim 9, wherein the step of transmitting uses a bandwidth from among equal to or greater than three types of defined bandwidths.

14. The transmission method as claimed in claim 9, wherein a plurality of candidates of bandwidths that can be used in the step of transmitting are respectively defined as the maximum bandwidths that can be used by a base station apparatus.

15. A transmission method, wherein a plurality of types of bandwidths are defined for use in a communication system, the transmission method comprising the steps of:
transmitting downlink transmission data by using a bandwidth of the plurality of types of bandwidths in a band centered on a predetermined center frequency;
multiplexing a control channel into a center band of a predetermined width including the center frequency of the band irrespective of the bandwidth to be used; and
multiplexing a synchronization channel into the center band.

16. The transmission method as claimed in claim 15, wherein the step of multiplexing includes multiplexing the control channel only into the center band.

17. A communication system, wherein a plurality of types of bandwidths are defined for use in the communication system, the communication system comprising:
a base station configured to transmit transmission data by using a bandwidth of the plurality of types of bandwidths in a band centered on a predetermined center frequency, and to multiplex a synchronization channel into a center band of a predetermined width including the center frequency of the band irrespective of the bandwidth to be used; and
a mobile station configured to receive the synchronization channel from the base station to be synchronized with the base station, and to receive the transmission data from the base station.

18. The communication system as claim in claim 17, wherein the base station multiplexes the synchronization channel only into the center band, the center band comprising a plurality of subcarriers that use orthogonal frequency-division multiplexing (OFDM).

19. A base station apparatus, wherein a plurality of types of bandwidths are defined for use in a communication system, the base station apparatus comprising:
- a transmission unit configured to transmit transmission data by using a bandwidth of the plurality of types of bandwidths; and
- a multiplexing unit configured to multiplex a synchronization channel into a center band of a predetermined width including a center frequency of a band used in the transmission unit irrespective of the bandwidth used in the transmission unit.

20. The base station apparatus as claimed in claim 19, wherein the multiplexing unit multiplexes the synchronization channel only into the center band, the center band comprising a plurality of subcarriers that use orthogonal frequency-division multiplexing (OFDM).

21. A base station apparatus, wherein a plurality of types of bandwidths are defined for use in a communication system, the base station apparatus comprising:
- a transmission unit configured to transmit transmission data by using a bandwidth of the plurality of types of bandwidths; and
- a multiplexing unit configured to multiplex a control channel into a center band of a predetermined width including a center frequency of a band used in the transmission unit irrespective of the bandwidth used in the transmission unit,
wherein the multiplexing unit multiplexes a synchronization channel into the center band.

22. The base station apparatus as claimed in claim 21, wherein the multiplexing unit multiplexes the control channel only into the center band.

\* \* \* \* \*